Feb. 2, 1943. E. W. WHITING 2,309,813
FUEL TANK
Filed July 22, 1940

INVENTOR.
Edmund W. Whiting
BY Joseph F. Westall
ATTORNEY.

Patented Feb. 2, 1943

2,309,813

UNITED STATES PATENT OFFICE 2,309,813

FUEL TANK

Edmund W. Whiting, Chicago, Ill.

Application July 22, 1940, Serial No. 346,738

6 Claims. (Cl. 62—1)

This invention relates to containers for fuel having very low boiling points and incorporates means for refrigerating the fuel to maintain the same in liquid condition at atmospheric pressure.

Many fuels, such as propane, which are gasses at normal temperature and pressure are, insofar as other characteristics are concerned, highly desirable for use in internal combustion engines of the type commonly employed in aircraft. However, in order to store fuel of this character in useful quantities of small bulk at normal air temperature, the fuel must be held under compression. The tanks utilized for this purpose are necessarily strong and correspondingly heavy so as to withstand the pressure. As the weight of the fuel tank is a primary consideration in aircraft, the use of fuels which vaporize at temperatures below the normal temperature range of the atmosphere, has heretofore been generally avoided.

It is the principal object of the present invention to provide a tank in which fuels of very low boiling points may be maintained in liquid condition under substantially atmospheric pressure by the utilization of refrigerating means associated with the tank and operable to control the temperature of the fuel.

Another object is to provide a tank, insulated to minimize heat transfer from the atmosphere to the fuel, embodying heating and refrigerating apparatus controlled by regulating mechanism actuated in response to variations in pressure within the tank.

Another object is the provision of a cooling device in the fuel refrigerated by the evaporation of fuel drawn from the tank into said cooling device, the evaporation being induced by the mechanically-effected reduction in pressure within said cooling device, or within the tank itself.

Another object is to provide a valve assembly controlling a vent in the fuel tank operable to open in response to variations in pressure of predetermined degree within the tank with respect to atmospheric pressure, in combination with a thermal unit of greater sensitivity than the valve assembly to control the temperature of the fuel and coincidentally maintain the pressure of the fuel within a narrower range than will affect the valve assembly.

Other objects and corresponding advantages, such for example as light and economical construction, simplicity of operation, and positive control of the fuel temperature with consequent minimum loss of fuel through evaporation, will be apparent to those of skill in the art from the following description read in the light of the accompanying drawing, in which.

Figure 1:
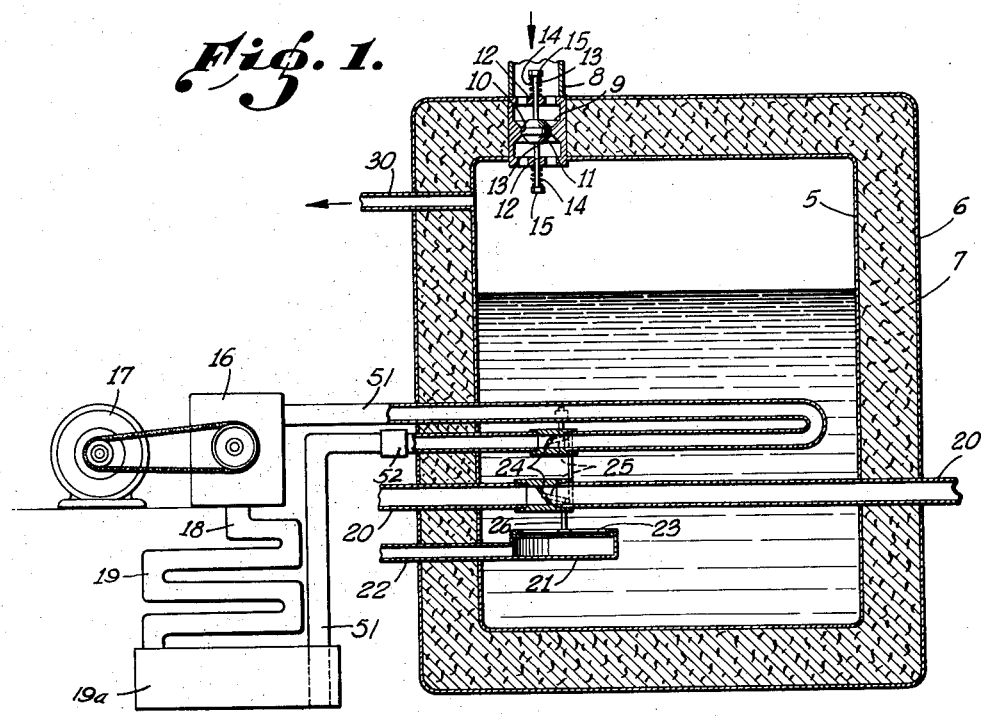
Fig. 1 is a sectional view of one embodiment of my invention illustrating the principal features thereof.

Referring to the drawing in detail, the numerals of which indicate similar parts through the several views, 5 designates a tank in which the fuel is stored. While the tank is illustrated as rectangular in cross section, it will be obvious to those of skill in the art that its shape may be varied to meet the requirements of economy of manufacture and of installation. The tank 5 is enclosed in an outer case 6 and the area between the case and tank is filled with a suitable insulating material 7, such, for example, as spun glass. A partial vacuum may be maintained between the case and tank by any conventional means (not shown) if desired. A vent pipe 8 from the tank extends through the top of the case 6 and insulation 7 for the admission of air into the tank or to relieve pressure therein. The pipe 8 may be connected to a dehydrator (not shown) of any conventional type to supply dry air to the tank when the pressure in the latter falls below atmospheric pressure.

An internal enlargement 9 in the vent pipe forms an annular valve seat 10 with which a valve 11 is adapted to cooperate. Spiders 12 secured in pipe 8 above and below valve seat 10 are formed with central openings through which valve stems 13 protruding from diametrically opposite sides of valve 11 slidably extend, so as to maintain the valve coaxially with the pipe. A helical spring 14 encircles each of the valve stems 13 above and below spiders 12, and bear against abutments 15 carried on the ends of stems 13 which they encircle, respectively. The springs 14 are of substantially equal strength, so as to normally, i. e., while pressure within the tank is substantially equal to atmospheric pressure, maintain valve 11 opposite its seat 10, so as to close the vent. It will be observed that a slight increase or decrease in pressure within the tank will displace valve 11 and relieve a condition of excessive pressure or a partial vacuum within the tank, thus preventing damage which might otherwise be caused to a lightly constructed tank in the event of failure of the pressure and temperature regulating apparatus, about to be described, to maintain pressure in the tank equal to that of the atmosphere.

Refrigerating apparatus for cooling the fuel in the tank when desired, comprises a compressor 16, of conventional construction, located exteriorly of tank 5 and case 6 and is operated by a motor generally indicated as at 17. A conduit 18 adapted to carry refrigerant, leads from compressor 16 and extends through a condenser 19 into a receiver 19a. A separate conduit 51 leads from receiver 19a into tank 5 through the case 6 and insulation 7, returning through the tank and case to the compressor. 52 indicates diagrammatically a conventional expansion valve in the conduit 51 adjacent the case 6. A pipe 20 leading from a source of heated fluid, as, for example, the exhaust manifold of an engine (not shown) with which the fuel tank is associated, extends through the tank directly below the portion of conduit 51 therein.

A flat bowl 21 having a hollow stem 22 leading therefrom is supported in the tank below pipe 20 by stem 22 which extends through the side of the tank and case. The bowl 21 is covered by a diaphragm 23 which is sealed to the edges of bowl 21. The interior of the bowl is in open communication with the atmosphere through the bore of stem 22 whereby atmospheric pressure is exerted against the underside of the diaphragm.

A pair of butterfly valves 24 are located in pipe 20 and the portion of conduit 51 within the tank, respectively, in substantial vertical alignment. Valves 24 are mounted on the ends of cranks 25 which are journalled in pipe 20 and conduit 51, respectively.

The lower end of a valve-actuating lever 26 is secured to the center of diaphragm 23. The upper end of lever 26 is slidably retained in a guide 27 attached to the side of the returning portion of conduit 51 within the tank. Lever 26 extends closely adjacent to pipe 20 and conduit 51 and is offset laterally beneath the outermost end of crank 25 in the pipe as at 28 (Fig. 2) and also above the outermost end of the upper crank 25 as at 29. Elevation of lever 26 causes its offset portion 28 to turn the lower crank and open the valve 24 in pipe 20. Downward movement of lever 26 from the position illustrated in Figs. 1 and 2 opens the valve 24 in the conduit 51 due to the abutment of the upper offset portion 29 of the lever against the outer end of the crank carried rotatably in the conduit 51. 30 indicates a feed line leading from tank 5 through the insulation 7 and case 6 to the point of use of the fuel.

Figure 2:
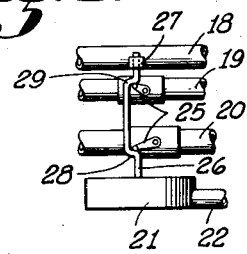
Fig. 2 is an elevation of the valve-actuating apparatus within the tank for controlling flow of hot and cold fluids through heating and refrigerating pipes.

The operation of the embodiment of my invention illustrated in Figs. 1 and 2 is briefly described as follows: The tank is preferably pre-cooled by suitable means (not shown) or by the refrigerating apparatus above described and refrigerated fuel is then pumped into the tank through the vent pipe. If desired, a separate supply pipe (not shown) may be provided in the tank for the admission of the fuel. The initial temperature of the tank and fuel will be low enough to prevent excessive or any loss of the fuel by evaporation or to condense fuel conducted into the tank in gaseous form. If the temperature of the fuel is lower than required, the vent valve 11 will remain open until air in sufficient quantities has passed into the tank and has equalized pressure within and outside the tank. After this occurs, the springs 14 carried by valve stems 13 will tend to maintain the vent valve closed. Thereafter slight changes in temperature and pressure in the tank with respect to atmospheric temperature and pressure will be immediately corrected by the heating and refrigerating mechanism; the vent valve 11 normally remains closed but affords a safety expedient to relieve undue pressure or a partial vacuum in the event of failure of the thermal-pressure unit to operate satisfactorily for any reason. As the temperature of the fuel rises to near the boiling point as a result of conduction of heat through the case, insulation and tank, a portion of the fuel will evaporate, gradually increasing the pressure in the tank. A slight increase of pressure will, to a proportionate degree, depress diaphragm 23 and draw the valve-actuating lever 26 down. The valve 24 in the cooling coil 18 will accordingly be opened by the turning of the crank 25 to which the valve is attached, in response to movement of lever 26 against the outer end of said crank. The circulation of fluid refrigerated to a temperature below the boiling point of the fuel, through the conduits 18 and 51 to the extent permitted by opening of the valve 24 therein will immediately lower the temperature of the fuel, condense the vapor in the tank, and relieve the pressure.

Conversely should the pressure within the tank be reduced below that of the atmosphere, resulting from use of the tank in air temperature below the boiling point of the fuel, or from drawing off fuel gas, diaphragm 23 will be expanded slightly so as to raise valve lever 26 and open the valve 24 in the pipe 20, thus permitting the passage of hot gasses or fluids therethrough. As the temperature of the fuel returns to normal, the pressure in the tank will approximate atmospheric pressure and accordingly diaphragm 23 will return to its original position, whereupon the valve will close. Due to the great sensitivity of the diaphragm and associated mechanism, the range of pressure sufficient to actuate the valve-actuating mechanism is of a lesser value than the variation in pressure required to displace the vent valve and accordingly there will be no loss of fuel through evaporation.

Figure 3:
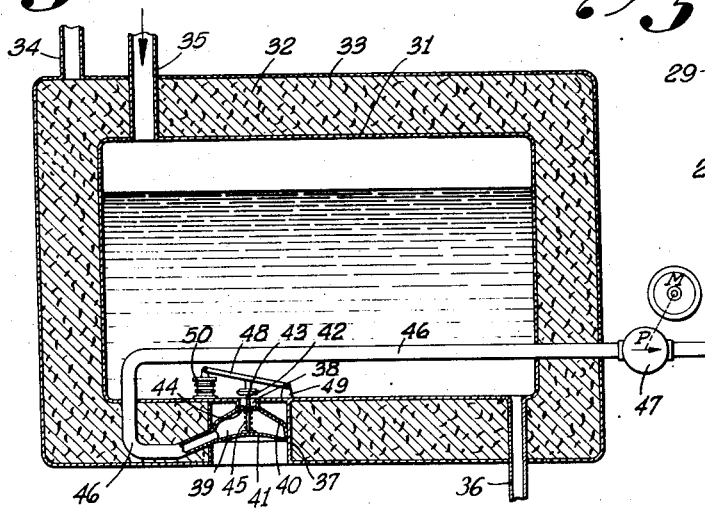
Fig. 3 is a sectional view of a tank constructed in accordance with a modification of the invention.

In the second embodiment of my invention illustrated in Fig. 3, the tank 31 is substantially the same as that illustrated in Fig. 1, though differing in shape. The tank is preferably enclosed in insulation 32 and an outer case 33 which is vented through nipple 34, as may also be the case of the above-described embodiment, in order to relieve pressure or partial vacuum which might be created therein under various thermal and pressure conditions to which the tank might be subjected. Or, as above noted in connection with the embodiment of Fig. 1, a partial vacuum may be drawn in the area between the case and tank through the nipple 34. It is desirable to dry the air admitted into the case through the nipple and accordingly the nipple is preferably connected to a common form of dehydrator.

The tank is vented and fuel is supplied through a tube 35 extending through the top of case 33 and the insulation. Where the tank is employed in aircraft, it is preferable that tube 35 be connected to a dehydrator for drying the air admitted into the tank through the tube when in use. A feed line 36 from the bottom of tank 31 extends through the insulation and case to a point of use.

In the insulation 32 between the bottom of the tank 31 and case 33, a cylinder 37 is secured. A port 38 in the bottom of the tank admits fuel from the tank into a diaphragm chamber 39 comprising a concave-convex hood 40 disposed in the cylinder and having a central opening therein registering with port 38, around which hood 40 is secured to the tank. Adjacent its periphery the hood is secured to cylinder 37. A diaphragm 41 forms the bottom of the chamber, the edges of the diaphragm being sealed to the periphery of the hood. Port 38 is controlled by a poppet-type valve 42, located within the tank, and supported by a stem 43 depending from the valve. Stem 43 extends through a spider 44 mounted in the central opening of the hood. The lower end of stem 43 is secured to the center of diaphragm 41. A helical spring 45 encircles stem 43 between spider 44 and diaphragm 41 to normally urge the stem downwardly, and valve 42 to its seat. A tube 46 is connected to the side of the hood and extends through cylinder 37 into insulation 32 and thence upwardly into tank 31. Tube 46 extends the length of the tank and passes through an opposite side thereof to a pump 47, located exteriorly of the case, adapted to draw a partial vacuum on the tube. One end of a lever 48 is pivoted within the tank to a suitable mounting 49 at one side of port 38. Lever 48 overhangs and is attached to the valve 42 and its opposite end is pivotally attached to the top of a thermostat 50 secured to the bottom of the tank.

The tank is preferably precooled before pumping the fuel therein. Pump 47 is then started to draw a vacuum on tube 46 and diaphragm chamber 39 to reduce pressure therein below that of the atmosphere. The external pressure accordingly tends to compress spring 45 on valve stem 43 and displace valve 42 from its seat. The thermostat 50, however, will be contracted when the temperature of the fuel is at the desired degree and lever 48 will accordingly be held in abutting relation with valve 42, so as to maintain the valve in closed position. The thermostat is adjusted to expand before the rising temperature of the fuel reaches that degree at which the fuel will vaporize and escape from the tank through tube 35. Upon expanding, the thermostat 50 raises the adjacent end of lever 48 and raises valve 42 from its seat. Due to the reduced pressure within diaphragm chamber 39, the diaphragm 41 will tend to collapse in response to atmospheric pressure, and will, under such conditions, assist the thermostat in overcoming the expansive urge of spring 45 in raising valve 42, as above noted. Fuel drawn from the tank through the open port 38 into diaphragm chamber 39 and tube 46 will immediately evaporate, due to the reduced pressure, taking heat units from the tube and fuel to effect this result. The fuel is immediately cooled by this conduction and expenditure of heat, causing thermostat 50 to contract. The lever 48, actuated by the thermostat will be accordingly again lowered against valve 42 which will be forced thereby to closed position.

It will thus be seen that I have provided a tank of light construction in which fuels having boiling points below atmospheric temperature and pressure may be maintained in liquid condition under approximately atmospheric pressure by a thermal unit operable to induce refrigeration by evaporation of fuel in requisite amounts, controlled by the temperature of the fuel; or by conventional heating and refrigerating apparatus actuated in response to variations in pressure in the tank with respect to atmospheric pressure.

While I have illustrated and described but two embodiments of my invention, it will be understood that other conventional heating and refrigerating expedients may be substituted for those shown, that a suitable condenser may be utilized with the apparatus of Fig. 3 to transform gaseous fuel passing from tube 46 to liquid form and return the same to the tank, and that numerous changes in size, design, number or proportion of the various parts may be made, without departing from the spirit of my invention, as defined by the appended claims.

What I claim and desire to secure by Letters Patent is:

1. In a device of the character described, a tank, heating and cooling apparatus within said tank, and means to control said apparatus operable in response to variations in degree of pressure within said tank with respect to pressure outside of the tank.

2. In a device of the character described, a tank, a cooling device and a heating device in the tank, means to control each of said devices comprising a diaphragm supported in the tank with opposite sides thereof exposed to air pressure and pressure within the tank, respectively.

3. In a device of the character described, a tank having a vent therein, a normally-closed valve controlling said vent, said valve being adapted to open in response to a balance of pressure of predetermined degree inside or outside said tank, insulation encasing said tank, and means to maintain pressure in said tank substantially equal to pressure outside thereof comprising heating and cooling mechanism, and means for controlling said mechanism operable to actuate said heating mechanism in response to a drop in pressure within said tank below a predetermined degree of greater value than the lowermost degree of pressure in the tank to which said valve will remain closed, and to actuate said cooling mechanism in response to an increase in pressure within said tank above a predetermined degree of lesser value than the greatest pressure in the tank to which said valve will remain closed.

4. In a device of the character described, a tank for liquid substances, refrigerating means within said tank, means including a diaphragm secured in said tank and exposed to pressure outside of said tank, said diaphragm being movable in response to said pressure to actuate said refrigerating means for maintaining the liquid substances at a temperature below a predetermined degree.

5. In a device of the character described, a tank for fuel, means including a diaphragm forming an evaporating chamber associated with said tank, said tank having a port therein opening into said chamber, valve means connected to said diaphragm controlling said port, a hollow cooling device connected to said chamber, and means to draw a partial vacuum on said chamber through said cooling device to evaporate fuel drawn from said tank through said port, said diaphragm being actuated to urge said valve means to open position by pressure against said diaphragm outside of said chamber.

6. In a device of the character described, a tank for fuel having an evaporating chamber associated therewith, means of communication for conducting fluid from said tank into said evaporating chamber, valve means to control said last-named means of communication, a diaphragm exposed to outside pressure connected to said valve means to actuate the same, means to draw a partial vacuum on said evaporating chamber, and a thermostatic element associated with said valve means to maintain the latter closed while the temperature of the fuel in the tank is below a predetermined degree.

EDMUND W. WHITING.